United States Patent [19]

Kennedy

[11] Patent Number: 4,521,544

[45] Date of Patent: * Jun. 4, 1985

[54] POLYURETHANE FOAM FROM CELLULOSIC PRODUCTS

[75] Inventor: Richard B. Kennedy, Ridgefield, Conn.

[73] Assignees: Patrick J. Crehan; Richard J. Fricke, both of Ridgefield, Conn.

[ * ] Notice: The portion of the term of this patent subsequent to Aug. 23, 2000 has been disclaimed.

[21] Appl. No.: 469,280

[22] Filed: Feb. 24, 1983

[51] Int. Cl.³ .............................. C08L 1/00; C08J 9/00
[52] U.S. Cl. .................................... 521/107; 521/108; 521/109; 521/110; 521/119; 521/123; 521/128; 521/131

[58] Field of Search ................. 521/84, 107, 108, 109, 521/110, 119, 123, 128, 131, 159; 524/127; 528/48

[56] References Cited

U.S. PATENT DOCUMENTS 4,230,822  10/1980  Murch et al. ...................... 521/109
4,400,475   8/1983  Kennedy ............................. 521/109

*Primary Examiner*—John Kight
*Assistant Examiner*—Kriellion Morgan
*Attorney, Agent, or Firm*—Eric P. Schellin

[57] ABSTRACT

A polyurethane foam can be made from waste cellulosic products such as papermill sludge, wood chips, wood particles, sawdust, waste paper or cardboard scraps. The polyurethane foam is made by reacting together a polyisocyanate, a catalyst, and a cellulosic material.

10 Claims, No Drawings

POLYURETHANE FOAM FROM CELLULOSIC PRODUCTS

BACKGROUND OF THE INVENTION

The present invention relates to a method for preparing a foam composition from cellulosic products such as papermill sludge, waste paper scraps, wood chips, sawdust, wood particles, and the like.

In the manufacture of paper, a variety of materials are added to the paper pulp prior to and during the sheet-forming operation for the purpose of producing desired properties in the finished paper, such as proper surface, opacity, strength, and feel. For example, finely ground inorganic fillers such as talc, certain clays, calcium carbonate, blanc fixe, and titanium dioxide, are added to all papers, except absorbent types (tissue or blotting paper), to improve surface smoothness, whiteness, printability, and opacity. Sizing agents, such as soaps, gelatins and rosins (with alum), wax emulsions and starches, are added to most papers for improving resistance to penetration by liquids. In addition, coloring agents, such as acid, basic, direct, and sulfur dyes and natural and synthetic pigments are added to most pigments.

Substantial quantities of water are recovered during the sheet forming operation and recycled to the process after filtering. The solid residue or so-called papermill sludge separated from the recovered water primarily contains wood fibers and additive materials, particularly filler such as clay. Uses for this sludge are quite limited and, consequently, it is often disposed of as waste. Thus, some effort has been made to develop new uses for this waste product.

Another waste product for which disposal is a problem is paper, such as office waste paper, cellulose packing waste such as cardboard packing boxes, and the like. Office waste paper cannot be used in conventional cellulose blown-in insulation because most paper used in offices has been treated with clay fillers. The borate flame-retardants used with conventional cellulose insulation do not adhere well to paper particles which have been treated with clay. Packaging materials such as cardboard boxes likewise are not suitable for use in conventional cellulose insulation, as the glues used in making these boxes provide food for rodents and insects.

Yet another cellulosic product for which uses must be found is wood waste products, such as wood chips, sawdust, wood particles, and the like. These cellulosic materials are sometimes used in making particle boards which are often replacements for wood as building materials.

Haataja et al, in U.S. Pat. No. 4,221,751, disclose a process for making pallets from papermill sludge by blending dried, comminuted papermill sludge with a fibrous reinforcing material and a resinous particle board binder. Suitable binders for use in this process include thermosetting resins such as phenolformaldehyde, resorcinolformaldehyde, melamine formaldehyde, urea formaldehyde, urea furfural, and condensed furfuryl alcohol resins, and organic polyisocyanates, either alone or combined with urea- or melamine-formaldehyde resins.

SUMMARY OF THE INVENTION

It has now been discovered that waste cellulosic products such as wet papermill sludge, wood chips or particles, or waste paper or cardboard scraps, or the like, can be formed into a foamed or a rigid, non-foamed product product. The properties of the foamed product can be tailored, by controlling the formulation, to a variety of uses, such as foamed-in-place insulation, fuel for providing heat energy, packaging materials, or building products.

The product produced by the present invention can be used as a fuel, comparing not unfavorably with conventional fuels. One pound of foam produced by the present invention has a heating equivalent of approximately 15,000 BTU. One pound of No. 2 heating oil has a heating equivalent of about 18,000 BTU.

Even waste paper with a high clay content can be used to prepare a fuel product according to the present invention. Although normally the clay in the paper interferes with burning, in the present process, the clay is encapsulated in the foam. The clay remains encapsulated in the char after burning, rather than congealing in an ash pit.

One does not need a flame retardant. However a flame retardant can be used. If a flame retardant is used in the formulation, the foam can be used as a foamed-in-place insulating material, or as sheathing, underflooring, or as a replacement for wood where waste wood products are used, such as sawdust, wood chips, or wood particles, a particle board can be formed that is light in weight but sufficiently strong to be used as a replacement for wood products such as plywood. The foamed product can be dyed or stained as desired.

Thus, the foam of the present invention can be used to dispose of papermill sludge without the need for dewatering presses, as well as to provide an alternative source of fuel.

The foam composition is based on a polyurethane made from a polyisocyanate, waste cellulosic material, and water or an aqueous slurry or solution of an untreated carbohydrate such as cornstarch, corn syrup, high fructose corn syrup, dextrose, sucrose, molasses, and the like. A polyurethane catalyst may be included in the composition to hasten the reaction. A surfactant may also be included in the composition to provide a foam having more open cells. Where a foam is desired, a plasticizer may be used.

When papermill sludge is used as the waste cellulosic material, the principal reaction involved occurs between the polyisocyanate and the water in the papermill sludge to yield a polyurethane polymer. The heat generated by the exothermic polymerization reaction causes the water in the sludge or waste cellulosic material, as well as any blowing agent present, such as low boiling hydrocarbons, to vaporize, whereby the vapors become entrapped to foam the desired cellular structure.

As used herein, the term "papermill sludge" means the solid residue separated from water recovered from various commercial papermaking processes. While the composition of the papermill sludge varies considerably, depending upon the particular papermaking process, the major ingredients are relatively fine wood fibers, usually about 35% by weight %, and inorganic fillers, particularly clay. The papermill sludge may also contain one or more of the additive materials mentioned above.

Where cellulosic waste other than papermill sludge is used, such as waste paper, waste cardboard, or waste wood products, the water which is bound in the hygroscopic waste cellulosic material reacts with the isocyanate used in the reaction. Because the water must be removed from the hygroscopic cellulose by the reaction with isocyanate, the reaction is not instantaneous. Thus, the presence of the cellulosic material in the reaction mixture controls the rate of reaction between isocyanate and water. The cellulosic material has been found to add strength during the gelation stage of the foam. Fibrous cellulosic material becomes dispersed in the foam. Chunks of cellulosic material, such as chunks of waste paper or cardboard or wood chips, are encapsulated in the foam and, when a flame retardant has been added to the foam, are thereby rendered flame retardant.

Isocyanates which can be used in the present invention include the following compounds: tolylene-2,4-diisocyanate, polymethylene polyphenyl isocyanate, methylene diisocyanate, tolylene-2,6-diisocyanate, and mixtures thereof, either crude or purified diphenylmethane 4,4′-diisocyanate, 3-methyldiphenylmethane-4,4′-diisocyanate, m- and p-phenylenediisocyanate, and naphthalene-1,5-diisocyanate. Either crude or pure isocyanates can be used. A prepolymer having isocyanate groups at the ends which can be prepared by the reaction of an excess of polyisocyanate with a lesser amount of a polyol having more than two hydroxyl groups per molecule can also be used in this invention. The combined use of more than two polyisocyanates is also possible.

Water is used with the carbohydrate in the form of a syrup to provide a carrier for the carbohydrates if used, and catalyst, surfactants, flame retardants, or any other optional ingredients. The amount of water used is kept to a minimum, accounting for water present in the papermill sludge, or in the waste cellulosic material, to prevent "sighing", i.e., collapse of the foam, as well as to aid in the reduction of the pressure of the foaming reaction.

The total amount of water used in the syrup, the term to be employed for the aqueous solution or slurry of the carbohydrate, should be from about one part of water to four parts of syrup to about four parts of water per one part of syrup, all parts by weight. The preferred ratio of water to syrup is 1:1.

To prepare the syrup for use in the present invention, preferably from one to 6 ounces of cornstarch or other untreated carbohydrate is mixed with about 10 ounces of water. There is no upper limit to the amount of carbohydrate that can be used in the present invention, other than viscosity limitations, as the cornstarch increases the viscosity of the mixture. Where corn syrup is used in the mixture, the corn syrup provides approximately 9% by weight of additional water to the mixture.

The amount of water in the composition, which also acts as a blowing agent for the foam, results in the restricted evolution of carbon dioxide, which is generated by the reaction of water with isocyanate. For the purpose of adjusting the density of the rigid foams, low boiling hydrocarbons, carbon dioxide, or chlorofluoroalkanes can be used as a blowing agent in conjunction with the water. Chlorofluoroalkanes which can be used in the present invention include those generally used in the preparation of polyurethane foams. Suitable hydrocarbons and haloalkanes should be chemically inert toward the polyisocyanate and have a boiling point less than 100° C., preferably from −50° C. to 70° C. Suitable haloalkanes include methylene chloride, ethylenetrichloride, trichloromonofluoromethane, dichlorodifluoromethane, dichlorotetrafluoroethane, and dibromomonofluoroalkane.

A catalyst may be used to form trimers of the isocyanate as well as to form urethane bonds and/or urea bonds and/or biuret bonds. Some catalysts which act in the formation reactions of trimers of isocyanate also show catalytic activity in the formation of urethane-, urea-, and/or biuret bonds, and vice versa. These catalysts cannot appropriately be classified in different categories, but they may be classified according to their most predominant catalytic tendencies, respectively, as adopted here.

Catalysts which act to form trimers of isocyanate in the present invention include 2,4,6-tris(dimethylaminomethyl) phenol, o- and p-dimethylaminomethylphenol, N,N′N″-tris(dimethylaminopropyl)-symhexahydrotriazine, benzyltrimethylammonium methoxide, alkali metal salts of carboxylic acids (such as potassium acetate, potassium propionate, potassium octanate, and potassium benzoate), alkali metal salts of weak acids other than carboxylic acids (such as, for example, potassium arsenate, sodium benzenesulfonate, potassium p-nitrophenolate), inorganic bases (such as sodium hydroxide and potassium hydroxide), sodium methoxide, salts of lead, cobalt, iron, cadmium, and chromium. Other useful catalysts include the aminohydroxy compounds, such as 2-amino-2-methyl-1-propanol, tris(hydroxymethyl)aminomethane, and 2-amino-2-ethyl-1,3-propanediol.

Catalysts which are liquid at room temperature may be used as is and mixed with the carbohydrate. Those catalysts which are solids may be used in the form of a solution prepared beforehand in dimethylformamide or dimethylsulfoxide, or mixed with the carbohydrate syrup.

Catalysts which act in forming the urethane bonds, urea bonds, and biuret bond are common to those which are used generally in the preparation of polyurethane foams. These catalysts can be conveniently classified into tertiary amines and organometallic compounds. The tertiary amines include triethylamine, triethanolamine, diethanolamine, monoethanolamine, dimethylpropanediamine, tetramethyl-1,3-butanediamine, and pentamethyldiethyltriamine. Organometallic compounds include, for example, dibutyltin dilaurate, dibutyl tin diacetate, butyl tin dicaprylate, and stannous octoate. Of course, these catalysts can be used either alone or in combination. The amounts to be used are in accordance with their reactivity.

Catalysts which have been found to be particularly useful in the present invention are aminohydroxy compounds, such as 2-amino-2-methyl-1, 1-propanol, tris(hydroxymethyl) aminomethane, and 2-amino-2-ethyl-1,3-propanediol.

Surfactants can be used to stabilize the foam during the foaming process, as well as to control the rigidity of the foam. Increasing the amount of surfactant decreases the rigidity of the foam. Surfactants which can be used in the present invention include Dow Corning 92-5098 ®, a.k.a DC5089, which is a nonhydrolyzable silicon glycol copolymer. Union Carbide's L-5420 ® is another nonhydrolyzable silicon glycol copolymer which may be used. Other surfactants include Air Product's LK-221 ®, LK-b 332, and LK-443, all organic surfactants which can be used as a total replacement for the usual silicone surfactants. Other Dow Corning silicone surfactants which can be used in foams made according to the present invention include Dow Corning 190, 191, 193, 196, 197, 198, 1312, F-11-630, 1315, Q2-5043, and Q2-5103.

To make the foam from sludge according to one embodiment of the present invention, the catalyst is mixed with the carbohydrate syrup and added to the papermill sludge. The surfactant is added to the isocyanate, and then added to the sludge mixture. The resulting exothermic chemical reaction dewaters the sludge and generates an open-celled foam. All the fine solids in the sludge are encapsulated in the foam.

When the resulting foam is exposed to flame, it burns but maintains its structure. The resulting ash from the burning is the slude solids contained in a carbonaceous foam, making this foam an ideal vehicle for hazardous waste disposal.

From about 5% to 20% by weight of carbohydrate syrup to about 95% to 80% by weight of sludge produces an acceptable foam, although about 10% carbohydrate syrup to about 90% sludge is the preferred ratio.

The catalyst-carbohydrate syrup combination can range from about 20% to 60% catalyst to about 80% to about 40% carbohydrate syrup, all by weight. The preferred combination is about 60% syrup and about 40% catalyst.

In some cases the papermill sludge tends to ball up during the blending step. This can cause inadequate intermixing of the wood fibers in the sludge with the other ingredients. The sludge-carbohydrate mixture may be further processed in a hammermill or similar milling device to insure homogeneous mixing of the wood fibers, bark, and binder. This additional step may not be required for blenders which also provide a milling action, such as disc-type refiners commonly used in the manufacture of fiberboard.

In another embodiment of the present invention, "dry" cellulosic waste products, such as shreds or chunks of waste paper or cardboard, or wood particles, wood chips, or sawdust are used in making the foam. The catalyst is mixed with the carbohydrate syrup and added to the waste cellulosic material. Any surfactant used is added to the isocyanate, and then added to the first mixture. An open-celled foam is generated in which all of the solid particles of the waste cellulosic material are encapsulated in the foam. Thus, any glues from cardboard or clay from papers are encapsulated in the foam and are not available as food for rodents or insects or as inhibitors to burning.

When the resulting foam is exposed to flame, it burns but maintains its structure.

Where an insulating material is desired, whether in the form of foamed-in-place insulation or a rigid board-like structure, a flame retardant can be added to the reaction mixture by mixing the flame retardant with the carbohydrate syrup. When this foam is exposed to flame, the foam tends to maintain its cell structure as well as to resist burning. This is unlike most polyurethane foams which melt and collapse when they are exposed to flame. The foam of the present invention generates very little pressure during reaction, so that it can conveniently be used as foamed-in-place insulation for existing structures without popping out wallboard or the like.

Any conventional flame retardant can be used in the foams of the present invention. Examples of such flame retardants include sodium chloride, calcium chloride, borax, an alkali metal borate, tricresyl phosphate, tris(2-chloroethyl)phosphate, tris(chloropropyl)phosphate, O,O-diethyl-N,N-bis-(2-hydroxyethyl)aminomethyl phosphonate, metal oxides and chlorides such as antimony oxide, alumina, and antimony oxychloride.

The rigid foams with flame retardant can be used as replacements for particle boards and other building materials. The density of the boards can be controlled by controlling the amount of catalyst and pressure on the product during foaming and molding. The resulting boards can be dyed or stained for any desired esthetic effects. The boards are sufficiently strong to be sawed into desired configurations and nailed into place.

Where a flexible foam is desired, as for packaging, the amount of surfactant in the mixture may be increased until the desired degree of flexibility is obtained.

To make the foams of the present invention, two mixtures of ingredients are combined. The first mixture is a combination of isocyanate and waste cellulosic material, which may be undehydrated papermill sludge. Flame retardant may optionally be present in this first mixture. The second mixture is a combination of carbohydrate syrup, catalyst, and optional additional water. The mixture of isocyanate may contain about 5–200 parts by weight isocyanate, about 0.1–2.0 parts by weight of optional surfactant, 5–75 parts by weight of optional flame retardant and 900 to 950 parts by weight of waste cellulosic material. The mixture of carbohydrate syrup may contain about 50–200 parts by weight of syrup (about 5–20% of which is water), 0.5–10 parts by weight of catalyst, and up to 10 parts by weight of additional water to modify the foam properties. Any optional blowing agent must be added to the isocyanate mixture. The blowing agent may be added in quantities ranging from 0.1 to 5 parts by weight.

To make the foam according to the present invention, the isocyanate mixture and the carbohydrate syrup mixture are thoroughly mixed together. The resulting mixture, which is liquid, is then introduced into a mold or behind a wall to form an insulating foam, or the ingredients can be combined in a commercially available mixing gun for introduction into a mold.

Alternatively, the foam can be applied directly to a substrate such as a wall by using the isocyanate mixture as a first coating on the substrate and spray the syrup mixture onto the substrate to form a foam.

A particularly rigid foam is formed where no surfactant and no additional water (other than that in the carbohydrate syrup) is used. This foam may be run through a press or rollers to control the rise of the foam. Alternatively, the catalyst may be added to the waste cellulosic material without the use of carbohydrate syrup. However, the carbohydrate syrup provides a foam with better resistance to cell collapse upon burning.

DESCRIPTION OF THE PREFERRED EMBODIMENTS

EXAMPLE I

To 90% by weight papermill sludge was added 10% of a mixture of catalyst and carbohydrate syrup (4% catalyst, 6% carbohydrate syrup). The catalyst was 2-amino-2-methyl-1-propanol, and the carbohydrate was regular corn syrup. To two parts of this mixture was added a mixture of polymethylene polyphenyl isocyanate (Mobay MONDUR MR ® and 1% Dow Corning DC193 silicone surfactant (non-hydrolyzable silicone glycol copolymer). The ingredients were mixed in a mixing tank of suitable capacity with an electric mixer, and poured into a slab mold. The resulting foam had a theoretical heat value of 15,000 BTU/pound, as compared with 18,000 BTU/lb. for No. 2 heating oil.

EXAMPLE II

A mixture is made of 95% papermill sludge and 10% of a mixture of catalyst and carbohydrate syrup (5% catalyst, 5% carbohydrate syrup). The catalyst is tris(hydroxymethyl)aminomethane. The carbohydrate is a slurry of four parts cornstarch (Corn Products Starch 3005) to six parts water. To two parts of this mixture is added a mixture of polymethylene polyphenyl isocyanate (Mobay MONDUR MR ®) and 1% Dow Corning Q2-5098 silicone surfactant. The ingredients are mixed in a mixing tank of suitable capacity in an electric mixer, and poured into a slab mold.

In order to introduce the foamable mixture of the present invention into a wall cavity, the following equipment can be used.

1. A mixing tank to blend the ingredients of the formulation. The mixing tank ideally possesses means to cool or heat the mix;
2. A high pressure, low volume metering transfer pump to measure and transfer the chemical mix from the mixing tank to the mold.

In addition, the composition of the present invention can be formed in standard, commercially available urethane foaming equipment which employs a mixing head and pumps the foam into a mold.

What is claimed is:

1. A polyurethane foam made by reacting together a polyisocyanate, a catalyst, a cellulosic material, and an aqueous solution of a carbohydrate.
2. The polyurethane foam of claim 1 wherein the carbohydrate is selected from the group consisting of cornstarch, corn syrup, high fructose corn syrup, dextrose, sucrose, and molasses.
3. The polyurethane foam of claim 2 wherein the carbohydrate is cornstarch.
4. The polyurethane foam of claim 2 wherein the carbohydrate is corn syrup.
5. The polyurethane foam of claim 1 wherein the cellulosic material is underwatered papermill sludge.
6. A method of making a polyurethane foam comprising:
   a. admixing a cellulosic material with a catalyst and an aqueous solution or slurry of a carbohydrate;
   b. combining the mixture of (a) and a polyisocyanate; and
   c. allowing the mixture to foam.
7. The method of claim 6 wherein the carbohydrate is selected from the group consisting of cornstarch, corn syrup, dextrose, high fructose corn syrup, sucrose, and molasses.
8. The method of claim 6 wherein the cellulosic material is papermill sludge.
9. The method of claim 6 wherein a surfactant is mixed with the polyisocyanate.
10. The method of claim 6 wherein a flame retardant is mixed with the cellulosic material and the catalyst.

* * * * *